United States Patent
Kim et al.

(10) Patent No.: US 11,941,755 B2
(45) Date of Patent: Mar. 26, 2024

(54) METHOD OF GENERATING MAP AND VISUAL LOCALIZATION SYSTEM USING THE MAP

(71) Applicant: NAVER LABS CORPORATION, Seongnam-si (KR)

(72) Inventors: Deok Hwa Kim, Seongnam-si (KR); Dong Hwan Lee, Seongnam-si (KR); Woo Young Kim, Seongnam-si (KR)

(73) Assignee: NAVER LABS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/517,720

(22) Filed: Nov. 3, 2021

(65) Prior Publication Data
US 2022/0139032 A1 May 5, 2022

(30) Foreign Application Priority Data
Nov. 3, 2020 (KR) .......................... 10-2020-0145496

(51) Int. Cl.
*G06T 17/05* (2011.01)
*G06T 7/70* (2017.01)

(52) U.S. Cl.
CPC ............... *G06T 17/05* (2013.01); *G06T 7/70* (2017.01); *G06T 2200/04* (2013.01); *G06T 2200/08* (2013.01)

(58) Field of Classification Search
None
See application file for complete search history.

(56) References Cited

U.S. PATENT DOCUMENTS

| | | | | |
|---|---|---|---|---|
| 5,926,581 A | * | 7/1999 | Pritt | G06T 3/0075 382/284 |
| 9,477,368 B1 | * | 10/2016 | Filip | G01C 21/367 |
| 9,672,656 B1 | * | 6/2017 | McPhail | G06T 15/04 |
| 2013/0063435 A1 | * | 3/2013 | Stannard | G06T 17/05 345/420 |
| 2013/0321403 A1 | * | 12/2013 | Piemonte | G06T 19/20 345/419 |

(Continued)

FOREIGN PATENT DOCUMENTS

| | | |
|---|---|---|
| JP | 2012-137933 A | 7/2012 |
| JP | 2017-156162 A | 9/2017 |

(Continued)

OTHER PUBLICATIONS

"Digital Elevation Model", Jul. 31, 2023, Wikipedia: 'https://en.wikipedia.org/wiki/Digital_elevation_model', pp. 1-10 (Year: 2023).*

(Continued)

*Primary Examiner* — Kent W Chang
*Assistant Examiner* — Jonathan M Cofino
(74) *Attorney, Agent, or Firm* — Harness, Dickey & Pierce, P.L.C.

(57) ABSTRACT

A method of generating a map for visual localization includes specifying a virtual camera pose by using 3-dimensional (3D) model data which is based on an image of an outdoor space captured from the air; rendering the image of the outdoor space from a perspective of the virtual camera, by using the virtual camera pose and the 3D model data; and generating a feature point map by using the rendered image and the virtual camera pose.

15 Claims, 12 Drawing Sheets

(56) References Cited

U.S. PATENT DOCUMENTS

| | | | | |
|---|---|---|---|---|
| 2014/0133741 A1* | 5/2014 | Wang | ................... | G06T 17/05 |
| | | | | 382/154 |
| 2014/0368493 A1* | 12/2014 | Rogan | ................... | G06V 40/20 |
| | | | | 345/419 |
| 2015/0110385 A1* | 4/2015 | Schmidt | ................... | G06T 7/74 |
| | | | | 382/154 |
| 2017/0200309 A1* | 7/2017 | Qian | ................... | G06T 15/04 |
| 2020/0020072 A1* | 1/2020 | Ely | ................... | G06T 3/0075 |
| 2020/0329227 A1* | 10/2020 | Yoshimura | ................... | H04N 13/117 |
| 2021/0333108 A1* | 10/2021 | Li | ................... | G06T 17/05 |
| | | | | 345/420 |

FOREIGN PATENT DOCUMENTS

| | | |
|---|---|---|
| JP | 2019-125227 A | 7/2019 |
| JP | 2020144710 A | 9/2020 |
| KR | 10-2020-0058079 A | 5/2020 |
| KR | 102115004 B1 | 5/2020 |

OTHER PUBLICATIONS

Office Action dated Jun. 21, 2022 issued in corresponding Korean patent application No. 10-2020-0145496.
Martin Cadik et al., 'Automated outdoor depth-map generation and alignment,' *Computers & Graphics*, vol. 74, 2018, pp. 109-118.
Japanese Office Action Corresponding to Application No. 2021-178859, dated Oct. 11, 2022.
Korean Notice of Allowance Corresponding to Application No. 10-2020-0145496, dated Oct. 20, 2022.
Japanese Notice of Allowance Corresponding to Application No. 2021-178859, dated Sep. 12, 2023.

\* cited by examiner (a)            (b)

METHOD OF GENERATING MAP AND VISUAL LOCALIZATION SYSTEM USING THE MAP

CROSS-REFERENCE TO RELATED APPLICATION

Pursuant to 35 U.S.C. § 119(a), this application claims the benefit of the earlier filing date and the right of priority to Korean Patent Application No. 10-2020-0145496, filed on Nov. 3, 2020, the entire contents of which are incorporated herein by reference.

BACKGROUND

1. Technical Field

At least one example embodiment relates to a method of generating a map which is utilizable for visual localization, and a visual localization system using the map.

2. Description of the Related Art

Location determination technologies have been developed as various types of systems such as GPS, inertial sensor-based localization, visual localization, simultaneous localization and mapping (SLAM), and visible light communication (VLC) are correlated to each other.

Among such location determination technologies, the visual localization is a technology to search for a position through captured pictures. When compared with GPS, the visual localization has advantages that an error is smaller and even a direction that a user faces can be more precisely measured. However, for the visual localization, a map for specifying a position through a comparison with captured pictures should be established.

Recently, as on-line map generation techniques have been highly developed, many IT companies are providing map information on an outdoor space and corresponding services. For instance, a method of generating a 3D map by using aerial photos captured from the air by an airplane, a drone, etc. is being actively developed.

For instance, Korean Laid-Open Patent No. 10-2020-0058079 (Publication date: May 27, 2020) is related to an aerial photographing device and a method for generating a 3D modeling and an orthophotograph, and Korean Registration Patent No. 10-2115004 (Publication date: May 26, 2020) is related to a device and method for generating a 3D map by using aerial photos.

Since such 3D model data which is based on aerial photos has image information, it can be utilized as data to construct a map for visual localization. Thus, a method using 3D model data which is based on aerial photos may be considered in order to generate a map for visual localization.

Acknowledgement: This invention was supported by Development of innovation technology for ICT industry convergence (R&D) program of MSIT (Ministry of Science and ICT) and IITP (Institute of Information & Communications Technology Planning & Evaluation). [1711125948, 2019-0-01309-003, Development of AI Technology for Guidance of a Mobile Robot to its Goal with Uncertain Maps in Indoor/Outdoor Environments, 2021 Jan. 1~2021 Dec. 31, Lead Organization: Electronics and Telecommunications Research Institute].

SUMMARY

Therefore, an aspect of at least one example embodiment is to provide a method of generating a map for visual localization, by using 3-dimensional model data which is based on an aerial photo, and a system.

More specifically, at least one example embodiment provides a method of generating a 3D feature point map which is utilizable for visual localization at a road or a sidewalk, by using 3-dimensional model data.

Further, according to at least one example embodiment implements visual localization for estimating a 3D position and a pose with just a sheet of image, by utilizing a feature point map.

In order to achieve these and other advantages and in accordance with the purpose of this specification, in a method of generating a map and a visual localization system using the map, 3D model data which is based on aerial photos is rendered as an image at a virtual camera viewpoint, and a map for visual localization is established based on the rendered image. For instance, plane coordinates are obtained from 2D map data, vertical coordinates are obtained from 3D model data, thereby defining 3D coordinates. And an image of an outdoor space is rendered by using a pose of a camera on the 3D coordinates. According to at least some example embodiments, a method of generating a map for visual localization includes specifying a virtual camera pose by using 3-dimensional (3D) model data which is based on an image of an outdoor space captured from the air; rendering the image of the outdoor space from a perspective of the virtual camera, by using the virtual camera pose and the 3D model data; and generating a feature point map by using the rendered image and the virtual camera pose.

The rendering of the image of the outdoor space may include rendering, together with the rendered image, a depth map corresponding to the rendered image by using the virtual camera pose and the 3D model data.

The generating of the feature point map may include extracting a feature point of an object positioned at the outdoor space by using the rendered image, and extracting 3D coordinates of the feature point by using the rendered depth map.

The feature point map may include the feature point, the 3D coordinates, and the virtual camera pose.

The rendering of the image of the outdoor space from the perspective of the virtual camera may include distinguishing unnecessary objects and necessary objects from each other, and rendering the image of the outdoor space from the perspective of the virtual camera by excluding the unnecessary objects.

The unnecessary objects may include at least one of trees, streets, persons or vehicles.

The image of the outdoor space captured from the air may include an area having no road between buildings separated from each other.

The method may further include generating lattice coordinates along a sidewalk positioned near a road by using two-dimensional (2D) map data of an outdoor space; and extracting vertical coordinates corresponding to the lattice coordinates, from the 3D model data which is based on the image of the outdoor space captured from the air, wherein the virtual camera pose is set based on 3D coordinates defined by the lattice coordinates and the vertical coordinates.

The generating of the lattice coordinates may include detecting longitude and latitude coordinates of nodes on the sidewalk by using the 2D map data; and converting the longitude and latitude coordinates into the lattice coordinates.

The 2D map data of the outdoor space may include plane coordinates of the sidewalk.

The 3D model data may include a digital elevation model representing a bare earth of the outdoor space, and the vertical coordinates may be extracted from the digital elevation model.

The image of the outdoor space captured from the air may include a plurality of picture images captured while the camera is moving, and the 3D model data may be generated by using a disparity among the plurality of picture images.

According to at least some example embodiments, a visual localization system may include a data base configured to store a feature point map; and a driving unit executed in a mobile device or an autonomous driving device, and configured to perform visual localization by using the feature point map and images captured by the mobile device or the autonomous driving device, wherein the feature point map is generated by using 3D coordinates and 3D model data, wherein the 3D model data is generated based on an image of an outdoor space captured from the air, and wherein the 3D coordinates are generated by using the 3D model data.

According to at least some example embodiments, a computer-readable medium stores computer-executable program instructions that, when executed by a processor, cause the processor to perform operations including specifying a virtual camera pose by using 3-dimensional (3D) model data which is based on an image of an outdoor space captured from the air; rendering the image of the outdoor space from a perspective of the virtual camera, by using the virtual camera pose and the 3D model data; and generating a feature point map by using the rendered image and the virtual camera pose.

Effects of at Least Some Example Embodiments

In the method of generating a map and the visual localization system using the map according to at least one example embodiment, a map is generated by using 3D model data based on aerial photos. This enables visual localization using a query image in the air, at the ocean, on the road and sidewalk, etc.

Further, since 3D model data is used, it is possible to generate an image rendered at a desired viewpoint and visual field. Further, there is an advantage that hindering factors in visual localization such as trees and roads can be excluded in a mapping process. Further, since 3D model data is used, a depth map without sensor noise can be generated, and a user's desired amount of data can be generated.

Further, according to at least one example embodiment, a map is generated by using pre-established data. This may allow a map generation without a previous scan process with respect to outdoor environments. This may enhance efficiency in time and costs.

Further, according to at least one example embodiment, a 3D map is reconstructed by utilizing 3D model data, and localization is performed by using the reconstructed 3D map. Accordingly, there is an advantage that a 3D position and a pose can be estimated with just a sheet of image.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
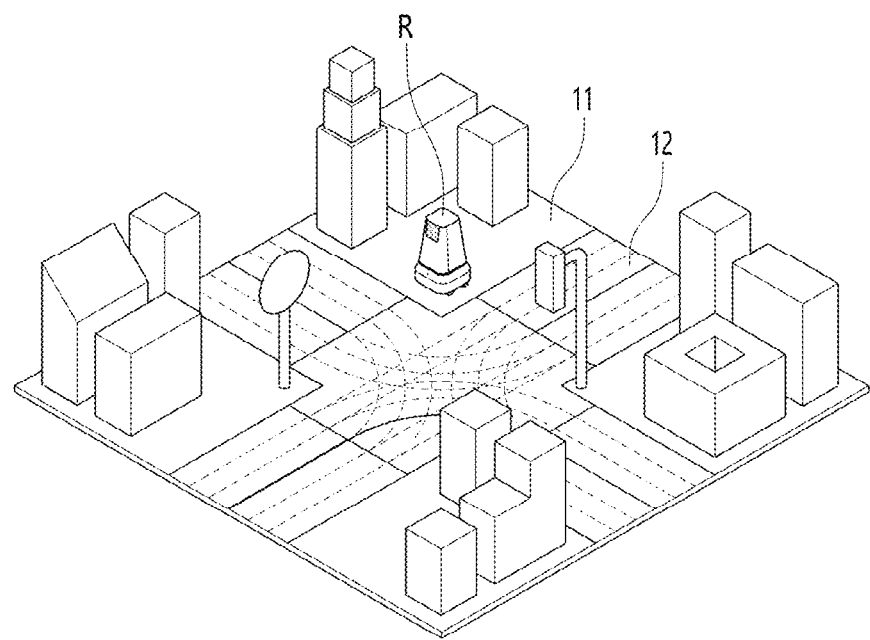
FIG. 1 is a conceptual view for explaining an operation to perform visual localization according to at least one example embodiment.

Description will now be given in detail according to example embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. According to at least one example embodiment, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, at least some example embodiments should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

At least one example embodiment relates to a map generation method and a visual localization system using the map. More concretely, at least one example embodiment may provide a system which performs visual localization in the air, at the ocean, on the road and sidewalk, etc., by using 3D model data which is based on aerial pictures.

According to at least one example embodiment, the aerial pictures may be referred to as a meaning to include aerial photos, aerial video images, aerial images, etc. Here, the aerial photos mean photos captured by cameras mounted in an airplane, an airship, a balloon, a drone, etc., and are mainly used to analyze environments and resources through creation of a topographic map and reading, to analyze shapes, etc.

In this case, a captured area may be established as 3D model data by processing a multiview image of the aerial photo. The 3D model data may include information on a 3D rendering image, an orthophotograph, a Digital Surface Model (DSM), a Digital Elevation Model (DEM), etc.

The rendering or image synthesis indicates a process of creating an image from models or scene files containing them, by using a computer program. The 3D rendering means a process of generating an image of a final result by providing a color and a texture to a model manufactured by 3D computer graphics, by forming a structure with a camera angle, and then by performing shading with light. Here, the image of the final result may be an image of the 3D rendering.

The orthophotograph is an image obtained after removing a displacement of an object, which has occurred due to a camera pose and a landform relief at the time of capturing a photo, which may be an image generated like a map of the same scale by compensating for distortion on a photo occurring according to a height of a ground surface.

The digital surface model is a model including all of relief features which are a natural shape of the ground surface, and topographic features which are an artificial shape of the ground surface. And the digital elevation model may be a model representing a shape of a bare earth by storing an elevation value of the ground surface in a digital manner.

According to at least one example embodiment, a feature point map for visual localization on a sidewalk, etc. is generated by using the 3D model data. However, the 3D model data according to at least one example embodiment is not limited to a single data set. For instance, it is possible that the 3D rendering image and the digital elevation model are obtained from different data sets, respectively.

The sidewalk means a walkway constructed together with a road where vehicles, etc. pass. The sidewalk is installed on both sides of a roadway, which allows both men and vehicles to pass corresponding areas and distinguishes their routes from each other. The sidewalk may be used to specify a pavement installed next to a roadway. However, at least one example embodiment is not limited to this. That is, the sidewalk is defined as a meaning which commonly calls a lane where persons pass.

The visual localization in the air, at the ocean, on the road and sidewalk, etc. means visual localization to check a precise self-position by using an image captured for the periphery without using GPS in the air, at the ocean, on the road and sidewalk, etc. Here, the visual localization on the sidewalk may mean checking a user's position from a peripheral image captured by the user who moves on foot.

According to at least one example embodiment, the visual localization may be performed at a mobile device or an autonomous driving device.

The mobile device may be a mobile terminal which is held by hand or which is wearable on the body, and the autonomous driving device may be a mobile device configured to be moveable autonomously.

For instance, the mobile terminal may include a portable phone, a smart phone, a laptop computer, a digital broadcasting terminal, personal digital assistants (PDA), a portable multimedia player (PMP), a navigation device, a slate PC, a tablet PC, an ultrabook, a wearable device, for instance, a smartwatch, smart glasses, a head mounted display (HMD), etc. And the autonomous driving device may be an autonomous driving vehicle, a drone, a robot, etc. Here, the robot may be a robot which provides a position-based service while moving, such as a cleaning robot, a guiding robot and a delivery robot.

According to at least some example embodiments, a new type of localization method and system for obtaining a position on a sidewalk or obtaining a position while a user moves on foot is explained on the basis of a position of the mobile device or the autonomous driving device. However, at least one example embodiment is not limited to this. That is, the mobile device or the autonomous driving device is understood as a means to measure a user's position, and other devices may be also applicable to at least some example embodiments.

Like this, the map generation method and the visual localization system using the map provide a user with current position information. For this, a map generated based on aerial images is used. Hereinafter, visual localization and a system for implementing the same will be explained firstly, and then a method of generating a map used for localization such visual localization will be explained in more detail with reference to the drawings.

Figure 2:
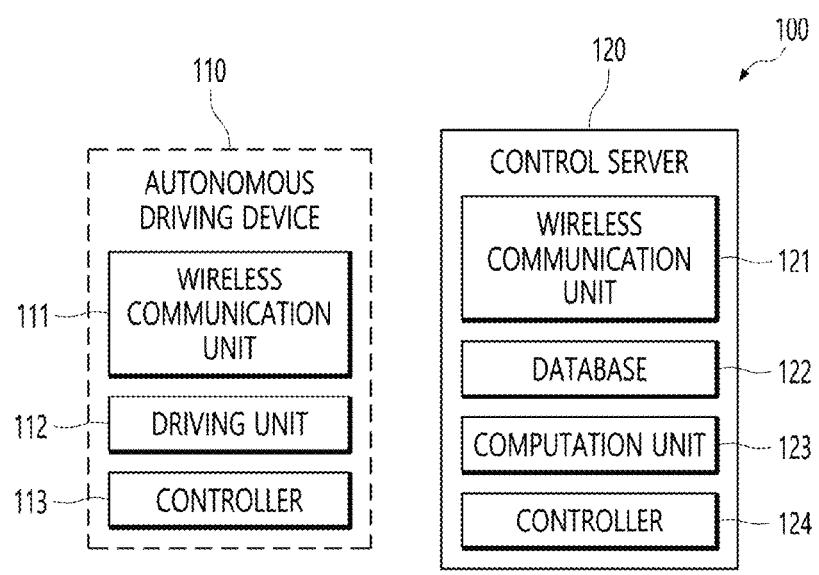
FIG. 2 is a view showing an example of a system which implements the visual localization of FIG. 1.

FIG. 1 is a conceptual view for explaining an operation to perform visual localization according to at least one example embodiment, and FIG. 2 is a view showing an example of a system which implements the visual localization of FIG. 1.

Referring to FIG. 1, a robot (R) serving as an autonomous driving device is positioned at an outdoor space. The robot may be a service robot such as a delivery robot or a guidance robot. However, there is no restriction on a type of a space where the robot (R) moves, and the robot is configured to drive in at least one of an indoor space and an outdoor space according to a necessity. In this embodiment, the robot (R) may be configured to drive on a sidewalk 11 where persons move on foot, in order to perform an allocated task such as a service provision.

In order to provide various services by using the robot (R), it is a very important factor that the robot (R) checks its position precisely and rapidly. Thus, the robot (R) may rapidly perform visual localization while driving through the sidewalk 11.

As an example of such visual localization, the robot (R) captures an image on one sidewalk 11 with viewing another sidewalk based on a roadway 12, and searches for its position by comparing the captured image with a 3D map. In this case, it takes a lot of efforts and time to generate a 3D map by obtaining images viewed from the sidewalk 11. According to at least one example embodiment, a feature point map is generated by using 3D model data, pre-established data. This implements a map generation without a previous scan process with respect to outdoor environments.

The feature point map is a map having data on 3D feature points, which may be referred to as a feature map, a distance map or a 3D feature point map. In this embodiment, shown is a map utilized for visual localization at a street such as a roadway or a sidewalk. However, the roadway or sidewalk is just an example of a spot where visual localization is performed. The feature point map according to at least some example embodiments may be also utilizable for aerial visual localization. Hereinafter, for convenience, at least some example embodiments will be explained with having visual localization on the sidewalk 11 as an example.

Also, the visual localization on the sidewalk 11 may be implemented through a visual localization system 100 shown with reference to FIG. 2.

The visual localization system 100 may include an autonomous driving device 110 and a control server 120. However, as aforementioned, the autonomous driving device 110 is shown as a robot (R) in this embodiment, and may be replaced by a mobile device.

The autonomous driving device 110 may include at least one of a wireless communication unit 111, a driving unit 112 and a controller 113.

The wireless communication unit 111 is configured to perform a wireless communication between the autonomous driving device and a control server, between the autonomous driving device and another autonomous driving device, between the autonomous driving device and a mobile device, and between the autonomous driving device and a communication network. For such a performance of a wireless communication, the wireless communication unit 111 may include a wireless internet module, a short-distance communication module, a location information module, etc.

The driving unit 112 may be executed at the autonomous driving device or a mobile device under control of the controller. The driving unit 112 is configured to perform visual localization by using a feature point map and images captured by the autonomous driving device or the mobile device. In order to perform visual localization, the driving unit 112 may include an image sensor, etc.

The feature point map is a map utilizable for visual localization at a viewpoint of the sidewalk positioned near the roadway 12, which may be a map manufactured for visual localization.

The controller 113 is configured to control a wireless communication, capture images, control the driving unit 112, and control the overall operations of the autonomous driving device or a mobile device. According to at least some example embodiments, any or all of the wireless communication unit 111, driving unit 112 and a controller 113 may be embodied by a circuit or circuitry.

In this case, the feature point map may be provided to the autonomous driving device 110 from the control server 120, or may be utilized for visual localization at the control server 120 by request of the autonomous driving device 110. The control server may include at least one of a wireless communication unit 121, a database 122, a computation unit 123 and a controller 124.

The wireless communication unit 121 performs a wireless communication with the autonomous driving device 110 under control of the controller 124. Also, the controller 124 controls a series of processes to generate, store and update a feature point map by interworking with the computation unit 123 and the database 122.

The database 122 stores therein the feature point map, and the feature point map may include coordinates information, point cloud information, image information, pose information, etc.

The computation unit 123 may be configured to firstly generate the feature point map, or to update the generated feature point map. As another example, the computation unit 123 can replace the functions of the driving unit 112 of the autonomous driving device 110. For instance, the computation unit 123 may calculate a position of the autonomous driving device 110 through a data processing for visual localization, an operation or the like, by using images captured by the autonomous driving device 110. Then, the computation unit 123 may provide the calculated position to the autonomous driving device 110.

According to at least one example embodiment, the feature point map may be implemented by extracting a feature point by using 3D model data generated based on aerial images, and by generating a rendering image. Like this, according to at least one example embodiment, a feature point map is generated by performing a 3D modeling through utilization of aerial images, and visual localization is performed by utilizing the feature point map. Accordingly, there is an advantage that a 3D position and a pose can be estimated with just a sheet of image.

Hereinafter, a method of generating such a feature point map will be explained in more detail with reference to the attached drawings.

Figure 3A:
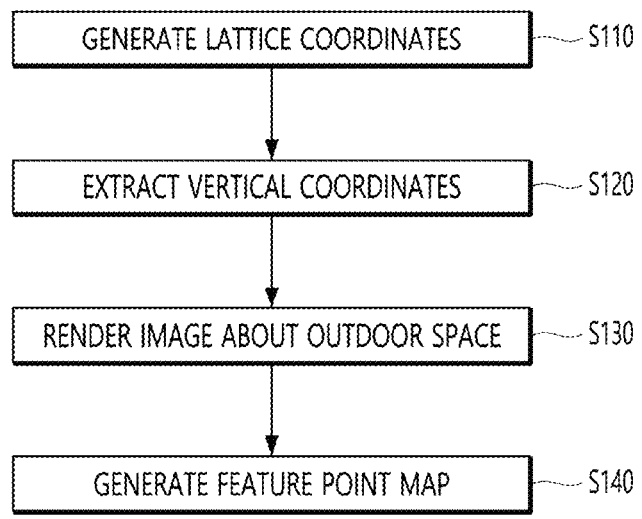
FIG. 3A is a flowchart for explaining a method of generating a map for visual localization according to at least one example embodiment.

FIG. 3A is a flowchart for explaining a method of generating a map for visual localization according to at least one example embodiment.

In a method of generating a map for visual localization according to at least one example embodiment, specifying a virtual camera pose by using 3D model data which is based on an image of an outdoor space captured from the air may be performed firstly. Then, the image of the outdoor space is rendered, and a feature point map is generated.

Referring to FIG. 3A, the method of generating a map according to at least one example embodiment may include generating lattice coordinates (S110), extracting vertical coordinates (S120), rendering an image of an outdoor space (S130), and generating a feature point map (S140).

In the generating of lattice coordinates (S110), lattice coordinates are generated along a sidewalk positioned around a roadway by using 2D map data of an outdoor space.

The lattice coordinates mean a coordinate system of a lattice shape where lengths and widths have a constant interval therebetween. In this case, the lattice coordinates may include coordinates of the sidewalk.

Next, in the step of extracting vertical coordinates (S120), vertical coordinates corresponding to the lattice coordinates are extracted from 3D model data which is based on an image of the outdoor space captured from the air. The vertical coordinates may be coordinates in a direction perpendicular to a ground surface, and may be extracted in correspondence to the lattice coordinates.

Then, in the step of rendering an image of an outdoor space (S130), a virtual camera pose is specified based on 3D coordinates defined by the lattice coordinates and the vertical coordinates, and the image of the outdoor space viewed from the virtual camera (i.e., from the perspective of the virtual camera) is rendered by using the virtual camera pose and the 3D model data.

The virtual camera pose may be a camera pose which captures an arbitrary point inside the outdoor space. Thus, the virtual camera pose may be specified based on an arbitrary space within the 3D modeling. In this case, the virtual camera may be positioned in an empty space not overlapped with an object (a building, etc.) within the 3D modeling.

Further, a coordinate value on the sidewalk may be defined by using the 3D coordinates. Here, since the coordinate value on the sidewalk is defined by the 3D coordinates, a camera pose on the sidewalk may be specified. Further, the image of the outdoor space viewed from the sidewalk may be rendered if the specified camera pose and the 3D model data are used. Like this, the camera pose is specified on the sidewalk on the basis of the sidewalk. This may enhance a precision degree of a map utilized when visual localization is performed on the sidewalk. Ideally, visual localization can be correctly performed even if a query image is introduced at any pose, regardless of a camera pose. However, considering a calculation error, etc., accuracy is the highest when an image pose for a map generation is consistent with a query image pose for localization. Thus, according to at least one example embodiment, a 3D coordinate system including a coordinate value is utilized to check coordinates of the sidewalk.

Further, the camera pose may include coordinates representing a positon, and a posture representing an orientation. In this case, the coordinates may be specified as coordinates obtained by adding a desired or, alternatively, predetermined height, e.g., a robot's height or a person's eye level, etc. to the coordinates of the sidewalk. Further, the posture may be arbitrarily specified. However, the posture may be specified similarly to a corresponding posture under an assumption that a robot or a person substantially transmits a query image. For instance, the posture may be specified on the basis of a direction parallel to the ground surface, a direction to face a building, a user's walking direction, etc.

Next, in the step of generating a feature point map (S140), a feature point map is generated by using the rendered image and the virtual camera pose.

As aforementioned, in the method of generating a map for visual localization based on aerial images according to at least one example embodiment, a feature point map is generated by using 2D map data and 3D model data. However, at least some example embodiments are not limited to this. For instance, it is possible to exclude a part of the steps of the method of generating a map for visual localization. For instance, in a case that ground surface coordinate data on the sidewalk is included in the 3D model data, the feature point map may be generated by excluding the step of generating lattice coordinates (S110).

Hereinafter, each step of the method of generating a map for visual localization will be explained in more detail with examples.

Figure 3B:
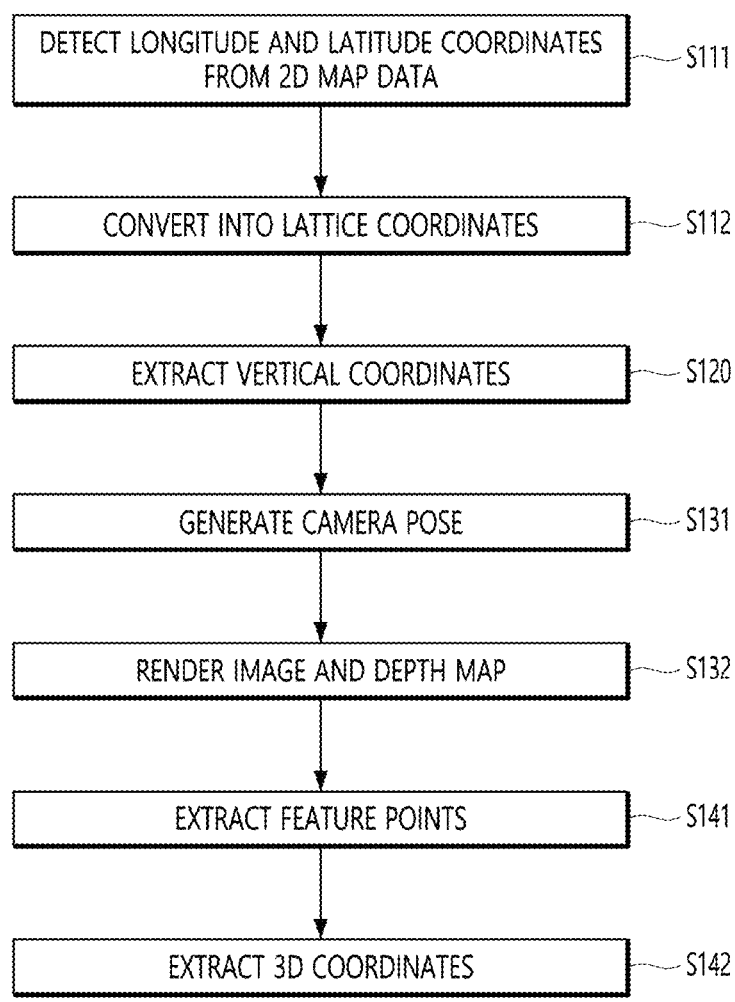
FIG. 3B is a detailed flowchart showing an embodiment of the flowchart of FIG. 3A.
Figure 4:
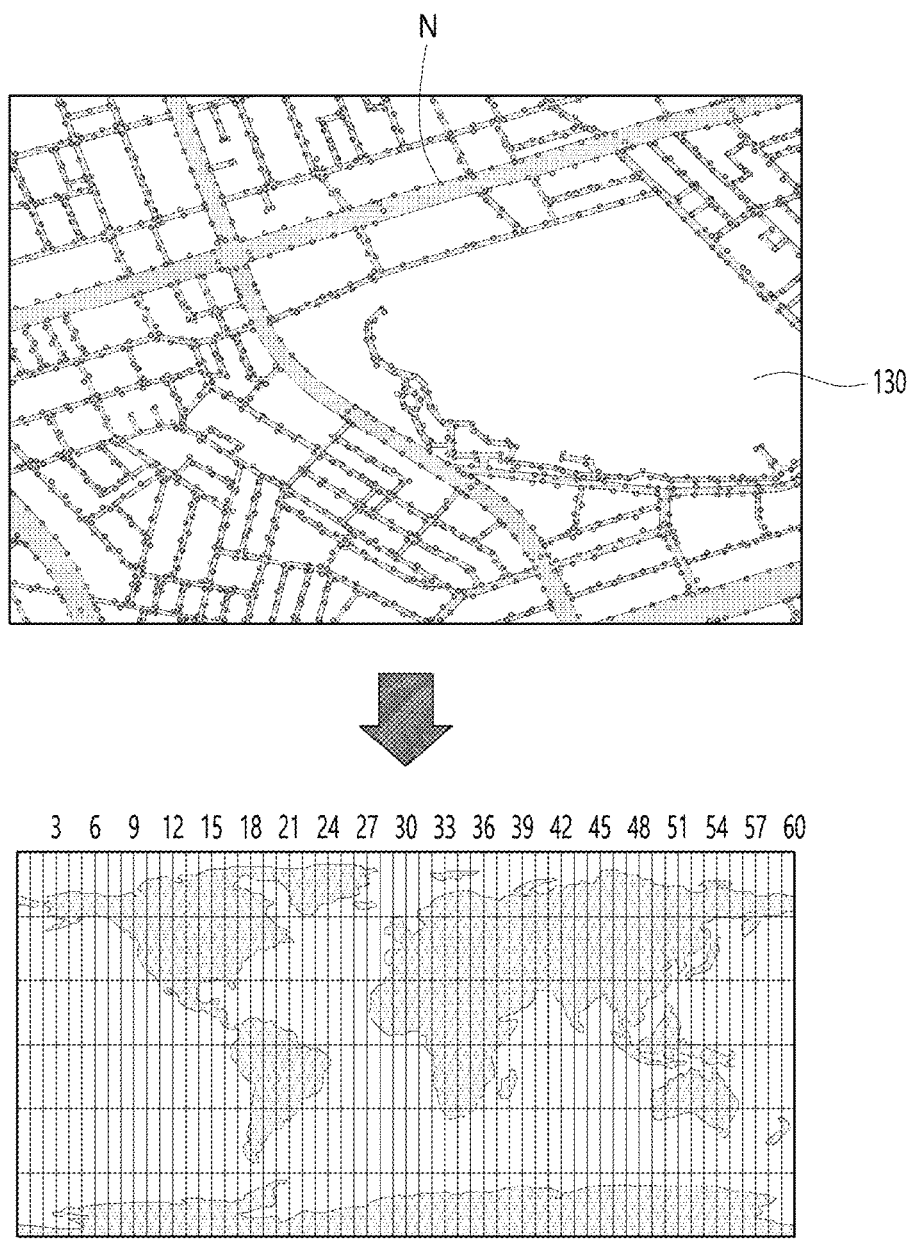
FIG. 4 is a conceptual view for explaining a method of generating lattice coordinates of FIG. 3B.
Figure 5A:
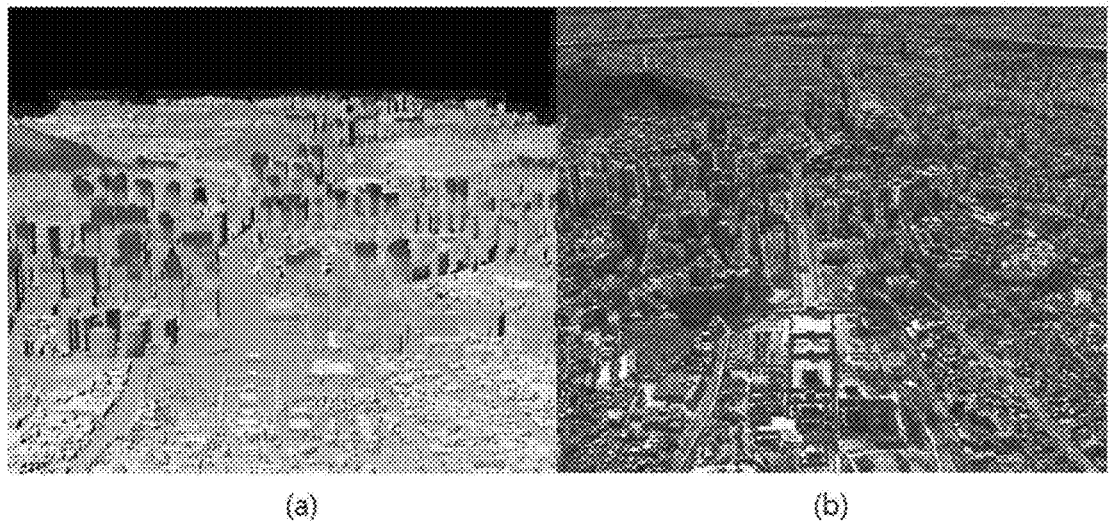
FIGS. 5A and 5B are photos representing examples of 3D model data and a digital elevation model, respectively.
Figure 5B:
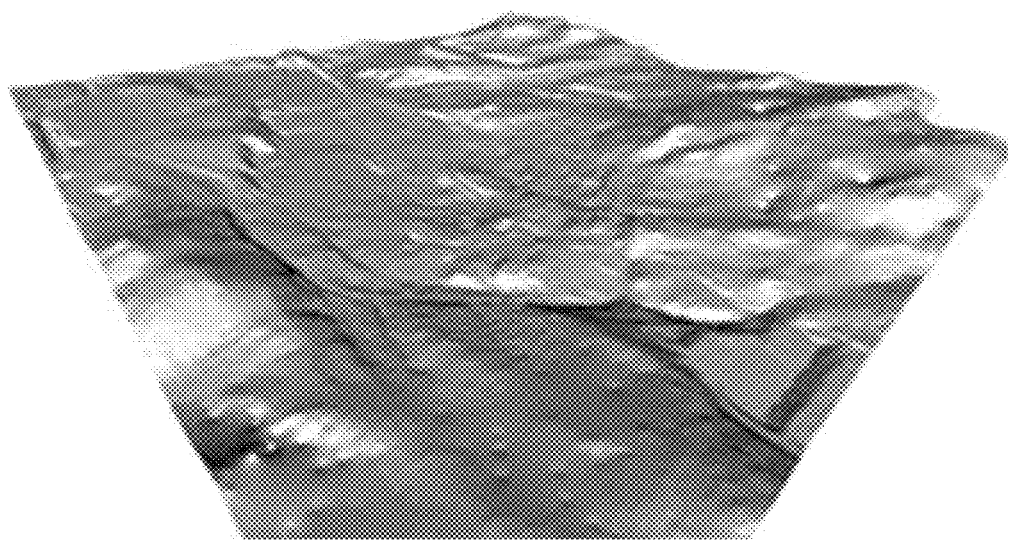
Figure 6:
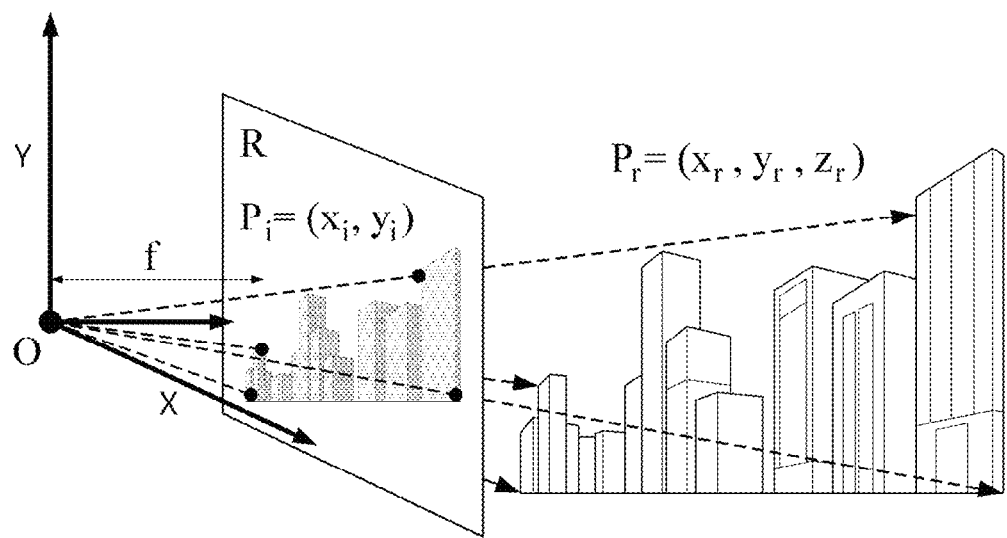
FIG. 6 is a conceptual view representing a pose of a camera which is to perform rendering.
Figure 7:
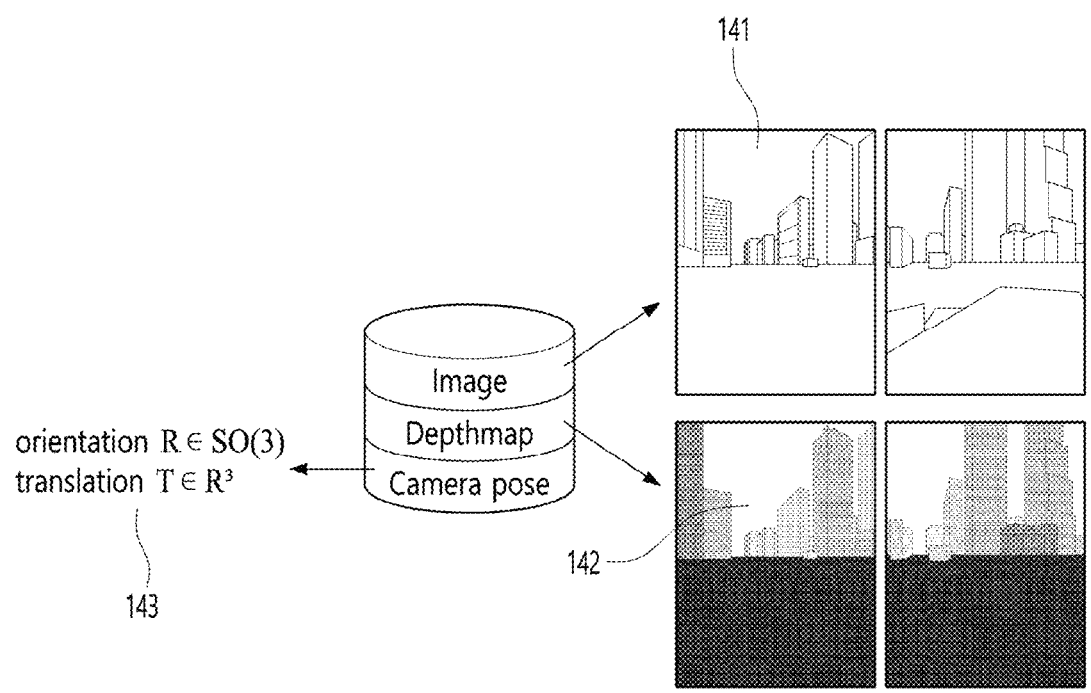
FIG. 7 is a conceptual view representing a data set established by processes of FIG. 3B.

FIG. 3B is a detailed flowchart showing an embodiment of the flowchart of FIG. 3A. FIG. 4 is a conceptual view for explaining a method of generating lattice coordinates of FIG. 3B. FIGS. 5A and 5B are photos representing examples of 3D model data and a digital elevation model, respectively. FIG. 6 is a conceptual view representing a pose of a camera which is to perform rendering. And FIG. 7 is a conceptual view representing a data set established by the processes of FIG. 3B.

Firstly, referring to FIG. 3B, the step of generating lattice coordinates (S110) may include a first step (S111) of detecting longitude and latitude coordinates from 2D map data, and a second step (S112) of converting the detected longitude and latitude coordinates into lattice coordinates.

In the first step (S111), longitude and latitude coordinates of nodes on the sidewalk are detected by using 2D map data.

The 2D map data may be map data provided from internet enterprises such as Naver or Google. As another example, the 2D map data may be map data publicized from the government and a government-affiliated organization, in an open application program interface (API) manner.

In this case, as shown in FIG. 4, the 2D map data 130 may include coordinates information on the sidewalk. More specifically, the 2D map data 130 may include plane coordinates of the sidewalk. As an example, the 2D map data 130 may include nodes (N) sequentially arranged at preset intervals along the sidewalk, and may be data having longitude and latitude coordinates of the nodes (N).

The longitude and latitude coordinates have the prime meridian (or Greenwich meridian) and an equatorial plane as reference surfaces, and may be a coordinate system having information on a latitude, a longitude and a height. More specifically, the longitude and latitude coordinates may be GPS coordinates of a longitude and a latitude. And Korea may have a coordinate value by degree between 124°~132° east longitude and 33°~43° north latitude.

Next, in the second step (S112), the longitude and latitude coordinates are converted into the lattice coordinates. Referring to FIG. 4, the longitude and latitude coordinates may be converted into coordinates of a Universal Transverse Mercator (UTM) coordinate system. The UTM coordinate system is a 2D plane coordinate system, and may consist of UTM areas. The UTM coordinate system may have a lattice coordinate system for representing positions as a unified system.

As a method to convert the longitude and latitude coordinates into UTM coordinates, a UTM projection conversion may be used, for instance. In this case, the coordinate conversion method is not limited to a specific example, and various techniques applicable to at least some example embodiments may be considered. Thus, in this specification, there is no restriction thereon.

Further, as aforementioned, at least one example embodiment includes a case that a coordinate conversion is not required in the step of generating lattice coordinates (S110). For instance, such a coordinate conversion may be excluded when 2D map data having lattice coordinates of the sidewalk is used.

Next, performed is extracting of vertical coordinates corresponding to the lattice coordinates from 3D model data which is based on an image captured from the air (S120). In this case, the extracting of the vertical coordinates may be a third step.

Here, as shown in FIG. 5A, the 3D model data may be model data of a city such as Seoul. For instance, a 3D model of a city scale may be established by using aerial photos of a large-scale area such as a city area.

The aerial photos may include a plurality of picture images captured from the air while a camera is moving, and the 3D model data may be generated by using a disparity among the plurality of picture images. By using the disparity, 2D pictures obtained by capturing a 3D outdoor space may be retrieved to a 3D real world.

For instance, if the same object is captured while a camera is moving right and left, a change amount is large when the object is closer to the camera. On the contrary, the change amount is small when the object is far from the camera. Here, the change amount may be a disparity, and 3D may be retrieved from a plurality of 2D pictures by using a size of the change amount.

More specifically, a distance of an object projected onto an image is calculated by using a disparity. Then, spatial coordinates are calculated in unit of points by using matching points from a pose-estimated picture. In this case, consecutive 3D digital surfaces (DSM=Digital Surface Model) are generated by gathering dense matching results estimated from a plurality of images obtained by capturing the same area on different positions. The dense matching may be an algorithm which constitutes a cost volume by digitizing a similarity degree of a picture (master) to neighboring pictures (slaves) according to each depth by changing the depth ((Depth=Disparity) with respect to each pixel (x, y) of the picture (master). Further, since such an algorithm is used, the 3D model data may include depth information of an object.

FIG. 5A(a) shows a 3D digital surface having a pseudo-color according to a height, and FIG. 5A(b) shows a 3D model resulting from a 3D digital surface and having undergone a textual processing as an aerial photo.

Further, the 3D model data may include a digital elevation model representing a bare earth of the outdoor space, and the vertical coordinates may be extracted from the digital elevation model. The digital elevation model shown in FIG. 5B has an elevation value of a ground surface, and coordinates in a direction perpendicular to the ground surface are extracted by using the elevation value. In this case, the vertical coordinates may be extracted as coordinates in a vertical direction at a spot corresponding to coordinates of the sidewalk included in the lattice coordinates.

Like this, as the lattice coordinates and the vertical coordinates are extracted, 3D coordinates may be defined along the sidewalk. Rendering an image of an outdoor space may be performed by using the 3D coordinates (S130).

The step of rendering an image of an outdoor space (S130) may include a fourth step (S131) and a fifth step (S132).

As shown in FIG. 6, in the fourth step (S131), a virtual camera which is to perform rendering may be set. More specifically, may be generated a virtual camera pose which is to perform rendering at a desired viewpoint by using the 3D coordinates. In order to establish a map for visual localization which is utilizable on the sidewalk, the desired viewpoint may be a sidewalk viewpoint. For instance, the pose includes a position and an orientation of a camera frame.

Referring to FIG. 6, a position of an origin point (O) is a position of a virtual camera. Here, a 3D model's direction to face a specific image may be calculated, and thereby a pose of the virtual camera is calculated.

More specifically, a ground control point (Pr) of FIG. 6 may be matched with the 3D coordinates, and a posture of an image (R) may be estimated on the basis of the ground control point (Pr). For such pose estimation, an aerial triangulation, e.g., a simultaneous bundle adjustment, etc. may be used. Once the posture of the image (R) is estimated, a position of the origin point (O) and a direction to face the image may be calculated.

In case of using a street view image obtained as a car moves around at streets for image capturing, it is impossible to obtain images at an area having no road. However, according to at least one example embodiment, since aerial photos are used, the virtual camera may be located at any desired position.

Once the virtual camera pose is generated, an image and a depth map are rendered in the fifth step (S132).

For instance, if the virtual camera pose is generated, an image 141 about the outdoor space viewed from the virtual camera (i.e., from the perspective of the virtual camera) may be rendered by using the 3D model data. In this case, a depth map 142 corresponding to the image 141 is rendered together with the image 141 about the outdoor space by using the virtual camera pose and the 3D model data.

Here, the depth map 142 may be a map representing a relative distance from the camera to an object on a 3D scene.

As shown in FIG. 7, the image 141, the depth map 142, and the camera pose 143 may be generated as a data set by rendering through the aforementioned processes.

Next, performed is a step of generating a feature point map (S140). The step of generating a feature point map (S140) may be a step of constructing a data set of a feature point map for visual localization on the sidewalk. More specifically, a map data set for visual localization is constructed by using the rendered image 141, the rendered depth map 142, and the camera pose 143 at the time of rendering. However, at least some example embodiments are not limited to this. For instance, it is also possible to construct a map data set for visual localization by using the rendered image and the camera pose.

As such an example, the step of generating a feature point map (S140) may include a sixth step (S141) and a seventh step (S142).

In the sixth step (S141), a feature point of an object positioned at the outdoor space is extracted by using the rendered image.

The object may be buildings 151, 152, etc. for instance. In this step, feature points 161 are extracted from the buildings 151, 152, etc.

The feature points 161 are characteristic spots on an image, which may be spots including critical information of the image. For instance, the feature points 161 may be corners of a building, etc.

Figure 9:
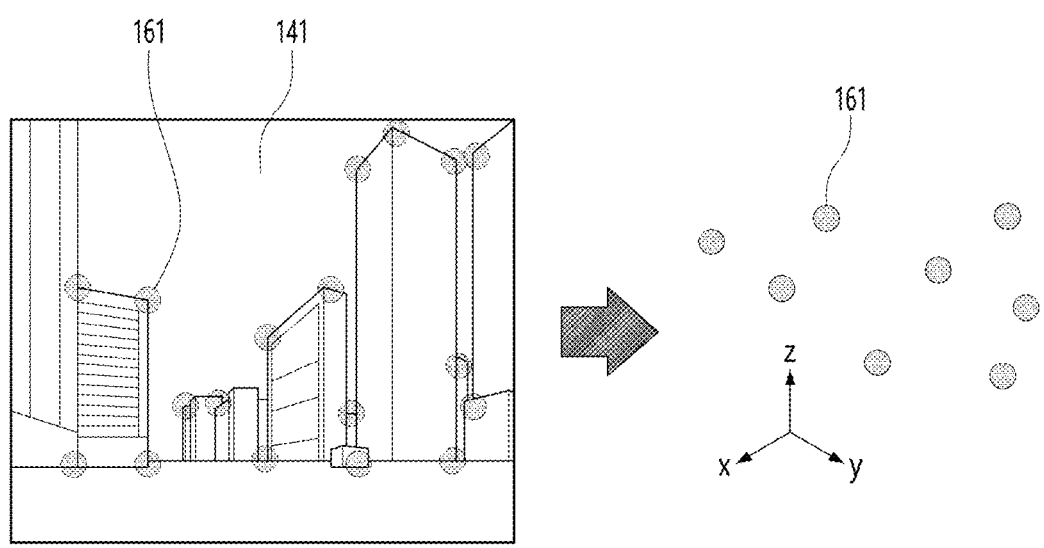
FIG. 9 is a conceptual view showing a method of extracting feature points and 3D coordinates from FIG. 3B.

In this case, as shown in FIG. 9, the feature points 161 of the rendered image 141 are extracted by using a feature point extraction technique. In this case, the feature point extraction technique is not limited to a specific example, and various techniques applicable to at least some example embodiments may be considered. Thus, in this specification, there is no restriction thereon.

Figure 8:
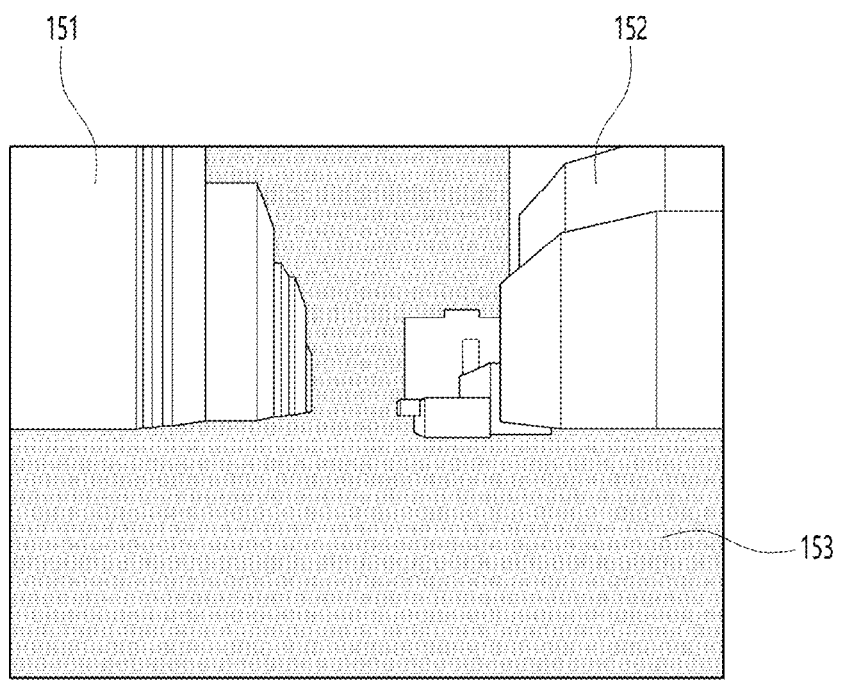
FIG. 8 is a conceptual view showing an example of an image rendered by the processes of FIG. 3B.

Here, as shown in FIG. 8, the rendered image may be an image rendered by excluding unnecessary objects. For example, examples of unnecessary objects include, but are not limited to, trees, streets, persons and vehicles.

If unnecessary feature points are extracted from a region of a road, a tree, a person, and a car inside an image, performance of visual localization is lowered and accuracy of mapping is lowered. In order to prevent this, may be removed objects which dynamically move or which vary according to the season, such as roads, trees, persons and cars, from which feature points are extracted.

More specifically, unnecessary objects are excluded between the buildings 151, 152 at the time of rendering an image. Through this, as shown in FIG. 8, the image of the outdoor space may include an area having no road between the buildings 151, 152 separated from each other. Thus, an image having only the buildings 151, 152 at a background 153 may be rendered.

Through such a method, according to at least one example embodiment, a spot which can be easily recognized even if some of objects are changed in shape, size or position and which can be easily found even if a camera viewpoint is changed, may be extracted as a feature point.

In this case, in the rendering of the image of the outdoor space, unnecessary objects and necessary objects may be distinguished from each other, and the unnecessary objects may be excluded from the image of the outdoor space.

Next, in the seventh step (S142), 3D coordinates of the feature points 161 are extracted by using the rendered depth map 142. More specifically, 3D coordinates of the extracted feature points 161 may be extracted by using the extracted feature points 161, the virtual camera pose 143, and the rendered depth map 142.

Through the aforementioned processes, the feature point map may be a data set having the feature points, the 3D coordinates, and the virtual camera pose.

Before a server for visual localization is operated, features (targets or objects), feature points, and 3D coordinates of the feature points are extracted in advance to thus be stored. When the server is operated, visual localization is performed by using only the extracted features and the 3D coordinates of the feature points. This may reduce unnecessary calculations used to read an image and a depth map.

It is possible to estimate a 3D position and a pose of a user who moves on foot with just a sheet of image, by utilizing a feature point map generated by using the aforementioned 3D model data which is based on aerial photos. For instance, the user may check a self-position by using a mobile device, or may be provided with services based on a self-position.

Figure 10:
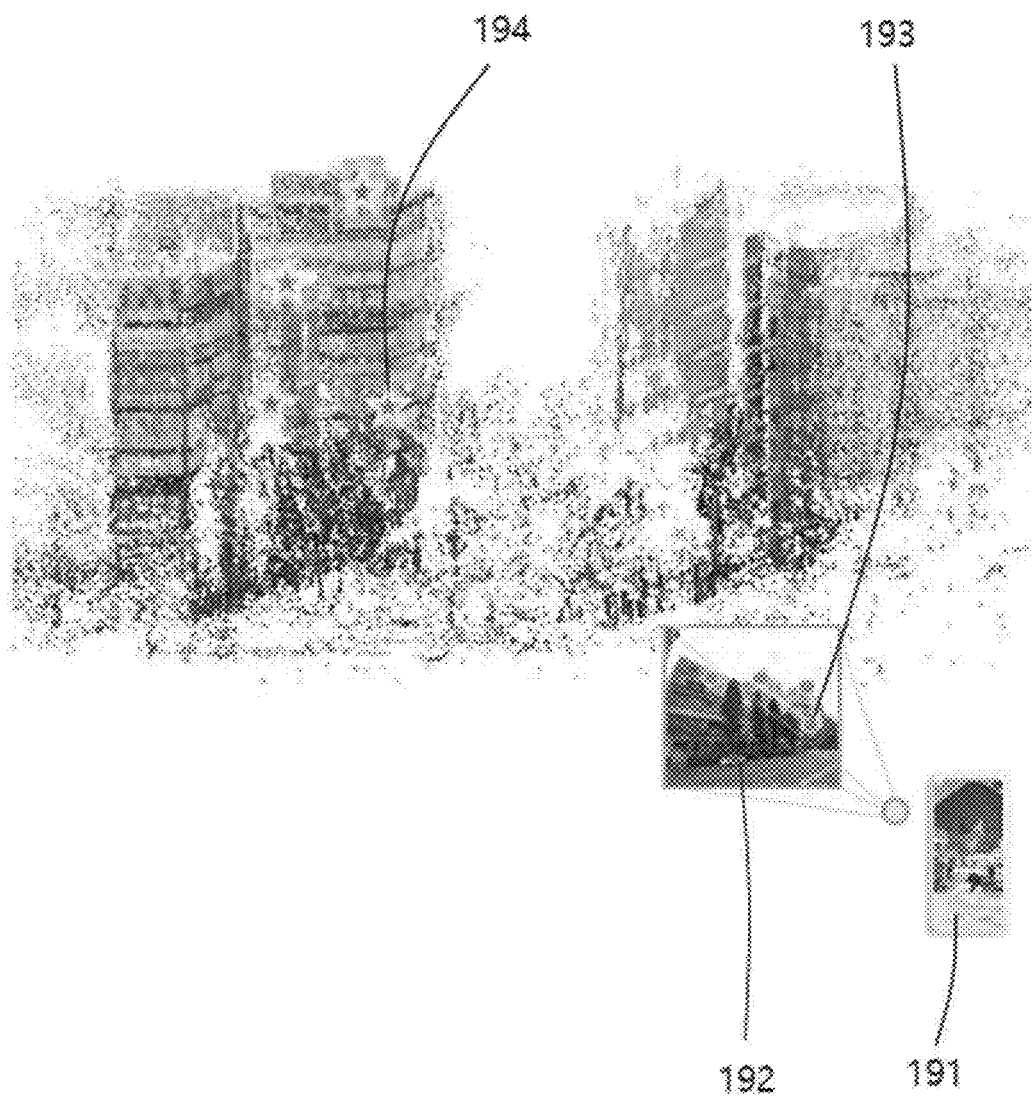
FIG. 10 is a conceptual view showing an example to perform visual localization by using the data of FIG. 9.

FIG. 10 is a conceptual view showing an example to perform visual localization by using the data of FIG. 9.

Referring to the drawing, visual localization may be performed at a user's mobile device as an example of the position service. For instance, a user may execute an application related to the visual localization service on a smart phone 191 in order to check a self-position at a specific spot while moving on foot, and may capture nearby streets. The application estimates a 3D position and a pose of the mobile device by comparing a feature point 193 of a captured picture 192 with a feature point 194 of a feature point map.

By using the estimated 3D position and pose, a precise position of the mobile device may be estimated. In this case, a plurality of services based on the position may be executed on the smartphone.

As aforementioned, in the method of generating a map and the visual localization system using the map according to at least one example embodiment, since 3D model data is used, it is possible to generate an image rendered at a desired viewpoint and visual field. Further, there is an advantage that hindering factors in visual localization such as trees and roads can be excluded in a mapping process. Further, since 3D model data is used, a depth map without sensor noise can be generated, and a user's desired amount of data can be generated.

One or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of generating a map for visual localization, comprising:

acquiring 3-dimensional (3D) model data which is based on an image of an outdoor space captured from air, the image of the outdoor space including a plurality of images captured by a camera while the camera is moving;

generating lattice coordinates along a sidewalk positioned near a road by using two-dimensional (2D) map data of the outdoor space;

extracting vertical coordinates corresponding to the lattice coordinates, from the 3D model data which is based on the image of the outdoor space captured from the air;

generating 3D coordinates along the sidewalk based on the lattice coordinates and the vertical coordinates;

specifying a virtual camera pose by using the 3D coordinates, the virtual camera pose including a position and a posture to capture a point inside the outdoor space from a viewpoint of the sidewalk;

rendering the image of the outdoor space from a perspective of the virtual camera, by using the virtual camera pose and the 3D model data, the image of the outdoor space being rendered from a viewpoint of the virtual camera using the 3D model data; and generating a feature point map by using the rendered image and the virtual camera pose, wherein the generating of the feature point map includes extracting a plurality of feature points from the rendered image, the plurality of feature points including, for at least one structure included in the rendered image, at least two feature points of the at least one structure.

2. The method of claim 1, wherein the rendering of the image of the outdoor space comprises:

rendering a depth map corresponding to the rendered image by using the virtual camera pose and the 3D model data, the depth map being separate from the rendered image.

3. The method of claim 2, wherein the generating of the feature point map comprises:

extracting 3D coordinates of each of the plurality of feature points by using the rendered depth map.

4. The method of claim 3, wherein the feature point map includes the plurality of feature points, the 3D coordinates, and the virtual camera pose.

5. The method of claim 1, wherein the rendering of the image of the outdoor space from the perspective of the virtual camera comprises:

distinguishing unnecessary objects and necessary objects from each other, and rendering the image of the outdoor space from the perspective of the virtual camera by excluding the unnecessary objects.

6. The method of claim 5, wherein the unnecessary objects include at least one of trees, streets, persons or vehicles.

7. The method of claim 5, wherein the image of the outdoor space captured from the air includes an area having no road between buildings separated from each other.

8. The method of claim 1, wherein the virtual camera pose is set based on 3D coordinates defined by the lattice coordinates and the vertical coordinates.

9. The method of claim 1, wherein the generating of the lattice coordinates comprises:

detecting longitude and latitude coordinates of nodes on the sidewalk by using the 2D map data; and converting the longitude and latitude coordinates into the lattice coordinates.

10. The method of claim 1, wherein the 2D map data of the outdoor space includes plane coordinates of the sidewalk.

11. The method of claim 1, wherein the 3D model data includes a digital elevation model representing a bare earth of the outdoor space, and
wherein the vertical coordinates are extracted from the digital elevation model.

12. The method of claim 1,
wherein the image of the outdoor space captured from the air includes a plurality of picture images captured while the camera is moving, and
wherein the 3D model data is generated by using a disparity among the plurality of picture images.

13. A visual localization system, comprising;
a data base configured to store a feature point map; and
a driving unit executed in a mobile device or an autonomous driving device, and configured to perform visual localization by using the feature point map and images captured by the mobile device or the autonomous driving device, wherein
the feature point map includes a plurality of feature points from a rendered image and is generated by using 3D model data and 3D coordinates,
the rendered image is an image of an outdoor space that is rendered from a viewpoint of a virtual camera using the 3D model data, the virtual camera having a virtual camera pose including a position and a posture to capture a point inside the outdoor space from a viewpoint of a sidewalk.
the 3D model data is generated from an image of an outdoor space captured from air, the image of the outdoor space including a plurality of images captured by a camera while the camera is moving,
the 3D coordinates are generated along the sidewalk based on lattice coordinates and vertical coordinates, the lattice coordinates being generated along the sidewalk positioned near a road by using two-dimensional (2D) map data of the outdoor space and the vertical coordinates being extracted from the 3D model data and corresponding to the lattice coordinates, and the plurality of feature points include, for at least one structure included in the rendered image, at least two feature points of the structure.

14. A non-transitory computer-readable medium storing computer-executable program instructions that, when executed by a processor, cause the processor to perform operations including:
acquiring 3-dimensional (3D) model data which is based on an image of an outdoor space captured from air, the image of the outdoor space including a plurality of images captured by a camera while the camera is moving;
generating lattice coordinates along a sidewalk positioned near a road by using two-dimensional (2D) map data of the outdoor space;
extracting vertical coordinates corresponding to the lattice coordinates, from the 3D model data which is based on the image of the outdoor space captured from the air;
generating 3D coordinates along the sidewalk based on the lattice coordinates and the vertical coordinates;
specifying a virtual camera pose by using the 3D coordinates, the virtual camera pose including a position and a posture to capture a point inside the outdoor space from a viewpoint of the sidewalk;
rendering the image of the outdoor space from a perspective of the virtual camera, by using the virtual camera pose and the 3D model data, the image of the outdoor space being rendered from a viewpoint of the virtual camera using the 3D model data; and
generating a feature point map by using the rendered image and the virtual camera pose,
wherein the generating of the feature point map includes extracting a plurality of feature points from the rendered image, the plurality of feature points including, for at least one structure included in the rendered image, at least two feature points of the at least one structure.

15. The method of claim 1, wherein the 3D model data is a digital elevation model representing bare earth of the outdoor space, the 3D model data being generated with a disparity among the plurality of images captured by the camera.

* * * * *